J. L. KLEINMAN.
DRIVING GEAR.
APPLICATION FILED OCT. 5, 1910.
999,037.
Patented July 25, 1911.
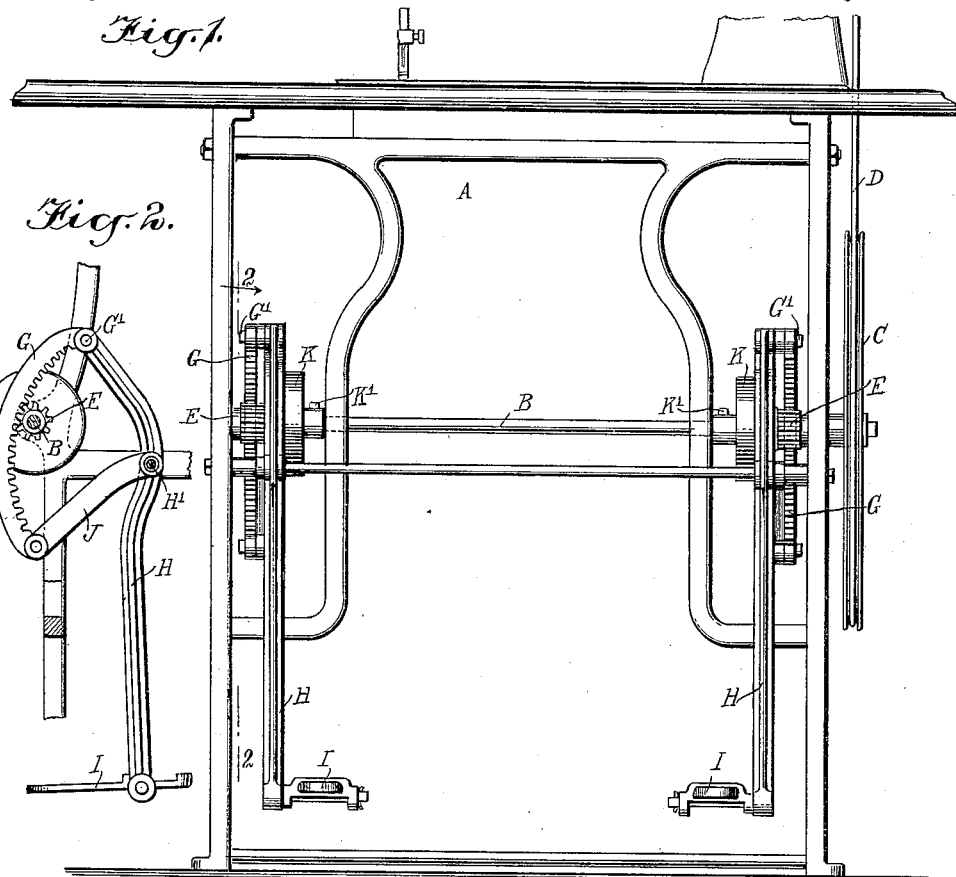
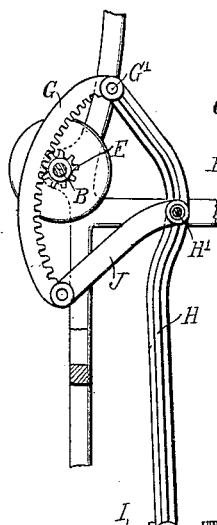
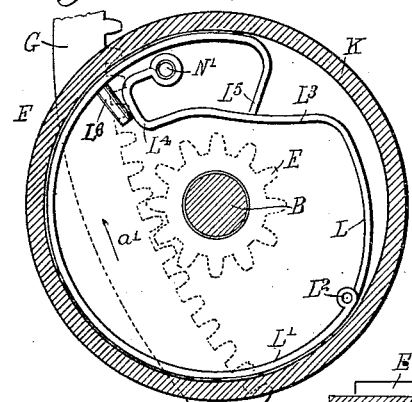
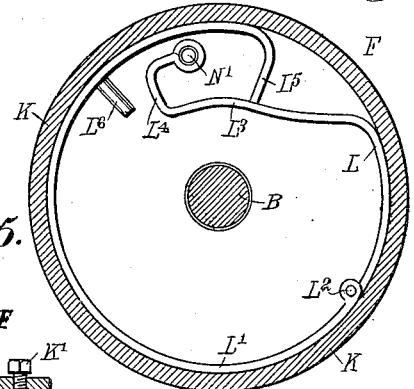
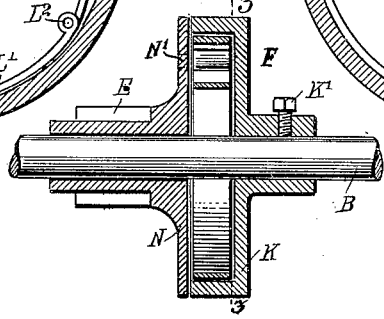
INVENTOR
Jacob L. Kleinman

UNITED STATES PATENT OFFICE.

JACOB L. KLEINMAN, OF NEW YORK, N. Y.

DRIVING-GEAR.

999,037.　　　　　Specification of Letters Patent.　　Patented July 25, 1911.

Application filed October 5, 1910. Serial No. 585,349.

*To all whom it may concern:*

Be it known that I, JACOB L. KLEINMAN, a subject of the Czar of Russia, and a resident of the city of New York, borough of Manhattan, in the county and State of New York, have invented a new and Improved Driving-Gear, of which the following is a full, clear, and exact description.

The invention relates to pedal-actuated driving mechanisms, and its object is to provide a new and improved driving gear more especially designed for use on sewing machines and the like, and arranged to convert the oscillating motion of the pedal into rotary motion without undue exertion on the part of the operator. For the purpose mentioned use is made of a pinion loose on the shaft to be driven, a segmental rack in mesh with the said pinion and connected with the pedal lever, and a friction clutch of special construction for connecting the pinion with the shaft.

A practical embodiment of the invention is represented in the accompanying drawings forming a part of this specification, in which similar characters of reference indicate corresponding parts in all the views.

Figure 1 is a front elevation of the driving gear as applied to a sewing machine; Fig. 2 is a cross section of the same on the line 2—2 of Fig. 1; Fig. 3 is an enlarged cross section of the friction clutch showing the parts in released position, the section being on the line 3—3 of Fig. 5; Fig. 4 is a like view of the same showing the parts in driving position; and Fig. 5 is a sectional side elevation of the same.

On the frame A of a sewing machine or the like is journaled the longitudinally-extending shaft B, connected by a grooved pulley C and belt D with a pulley (not shown) on the operating shaft of the machine. On the shaft B are mounted to rotate loosely pinions E connected by friction clutches F with the shaft B, and the said pinions E mesh with segmental racks G pivotally connected at their upper ends at G' with the upper ends of upright pedal levers H fulcrumed at H' on the frame A, and carrying at their lower ends pedals I under the control of the operator for imparting a rocking motion to the pedal levers H so as to move the racks G up and down and thus rotate the pinions E forward and backward. The lower end of each rack G is pivotally connected by a link J with the fulcrum H' of the corresponding pedal lever H, so that the rack G in its up and down movement is held at all times in proper mesh with the pinion E. By arranging the pedal lever H and the rack G in the manner described an up and down motion is given to the rack G from the upper end of the lever H, to rotate the pinion E with the greatest ease and without undue fatigue to the operator working the pedals I with the feet.

Each clutch mechanism F is arranged as follows: A drum K is secured by a set screw K', or other means, to the shaft B, and the inner surface of the rim of the drum K is engaged by a friction band made in sections L, L' pivotally connected with each other at $L^2$, the friction band L having a cam arm $L^3$ terminating in an angular stop $L^4$ pivoted on the pin N' projecting from a disk N secured to or forming an integral part of the pinion E. The disk N serves to close the open end of the drum K so as to protect the interior thereof against dust and other extraneous matter. The section L' of the friction band terminates in an angular arm $L^5$ in contact with the cam arm $L^3$ of the section L, and the said section L' is also provided with a stop pin $L^6$ for the stop arm $L^4$ to rest on, as indicated in Fig. 3. Now when the several parts are in the position shown in Figs. 3 and 5, and the rack G is moved upward in the direction of the arrow a' then the pinion E is rotated in the direction of the arrow b' and in doing so the pin N' is carried along and with it the free end of the friction band L, so that the latter swings in an outward direction, and in doing so moves into frictional engagement with the inner surface of the drum K (see Fig. 5), at the same time the cam arm $L^3$ pushes the angular arm $L^5$ outward so as to move the section L' into frictional contact with the inner surface of the rim of the drum K. Thus both sections L and L' of the friction band are moved in firm contact with the inner surface of the rim of the drum K, and consequently further rotation of the pinion E in the direction of the arrow b' causes a rotation of the drum K and the shaft B in a like direction. When the rack G swings downward then the motion of the pinion E is reversed, and in doing so the pin N' is carried backward, whereby the sections L and L' of the friction band are moved out of frictional engagement with the inner surface of the rim of the drum K and whereby rotation of the drum K and the shaft B in the inverse direction of the arrow $b'$ is prevented.

It is understood that when the pinion E returns in the inverse direction of the arrow $b'$ the pin $N'$ carries the section L back until the stop arm $L^4$ engages the stop pin $L^6$, and at this time the sections L and $L'$ are out of frictional contact with the inner surface of the rim of the drum K and consequently further rotation of the pinion E in the inverse direction of the arrow $b'$ causes the friction band to turn with the disk N and the pinion E, while the friction drum K and the shaft B remain at a standstill.

From the foregoing it will be seen that the oscillating motion imparted to the pedal lever H is converted into rotary motion for driving the shaft B and the operating parts of the machine on which the driving gear is used. It will also be noticed that a driving of the shaft B takes place only during the upward swinging movement of the racks G, while the shaft B remains at a standstill during the downward or return movement of the said racks.

The friction clutch shown and described is very simple and durable in construction and is composed of comparatively few parts, not liable easily to get out of order.

Having thus described my invention, I claim as new and desire to secure by Letters Patent:

1. A driving gear for sewing machines and the like, comprising a driven pinion, a shaft to be driven and on which the pinion is mounted to turn loosely, and a clutch mechanism connecting the said pinion with the said shaft, the said clutch mechanism having a friction drum secured on the shaft, and a band made in sections and adapted to engage the inner surface of the rim of the said drum, the said band sections being pivotally connected with each other, one section of the band being connected with the pinion and having a cam portion engaged by the other section.

2. A driving gear for sewing machines and the like, comprising a driven pinion, a shaft to be driven and on which the pinion is mounted to turn loosely, and a clutch mechanism connecting the said pinion with the said shaft, the said clutch mechanism having a friction drum secured on the shaft, a band made in sections and adapted to engage the inner surface of the rim of the said drum, the said band sections being pivotally connected with each other, and a disk on the said pinion and to which the free end of one of the said band sections is attached, the other band section having an angular arm engaging a cam portion on the first-named band section.

3. A driving gear for sewing machines and the like, comprising a driven pinion, a shaft to be driven and on which the pinion is mounted to turn loosely, and a clutch mechanism connecting the said pinion with the said shaft, the said clutch mechanism having a friction drum secured on the shaft, a band made in sections and adapted to engage the inner surface of the rim of the said drum, the said band sections being pivotally connected with each other, a disk on the said pinion and to which the free end of one of the said band sections is attached, the other band section having an angular arm engaging a cam portion on the first-named band section, and a stop on the second band section for the first section to abut against.

In testimony whereof I have signed my name to this specification in the presence of two subscribing witnesses.

JACOB L. KLEINMAN.

Witnesses:
   Theo. G. Hoster,
   Philip D. Rollhaus.

Copies of this patent may be obtained for five cents each, by addressing the "Commissioner of Patents, Washington, D. C."